July 8, 1952  L. T. HEIN ET AL  2,602,190
MOLD FOR PRODUCING A PLASTIC EDGE
PROTECTOR FOR LICENSE PLATES
Filed Aug. 2, 1948  2 SHEETS—SHEET 1
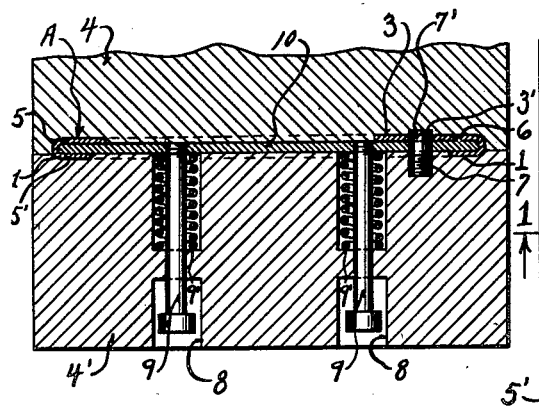
Fig.1.
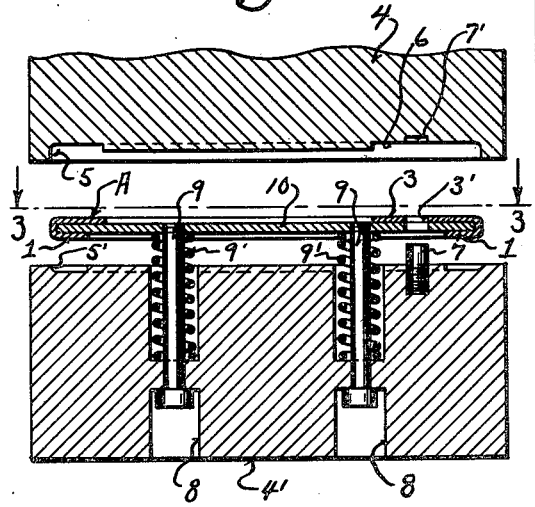
Fig.2.
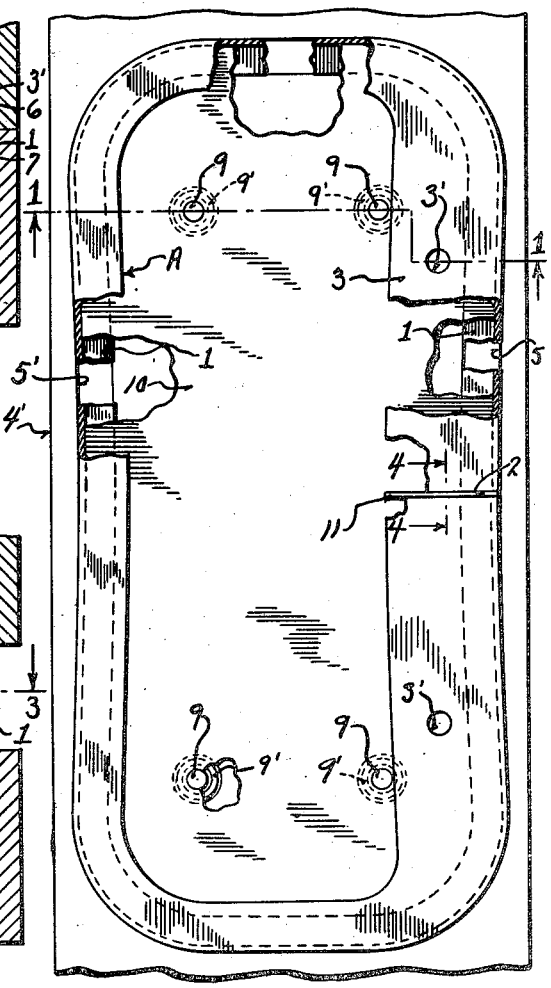
Fig.3.
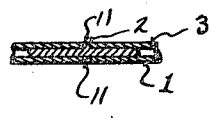
Fig.4.
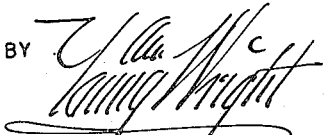
INVENTORS
LOUIS T. HEIN
HARRY BRATIS
BY
ATTORNEYS July 8, 1952 L. T. HEIN ET AL 2,602,190
MOLD FOR PRODUCING A PLASTIC EDGE
PROTECTOR FOR LICENSE PLATES
Filed Aug. 2, 1948 2 SHEETS—SHEET 2
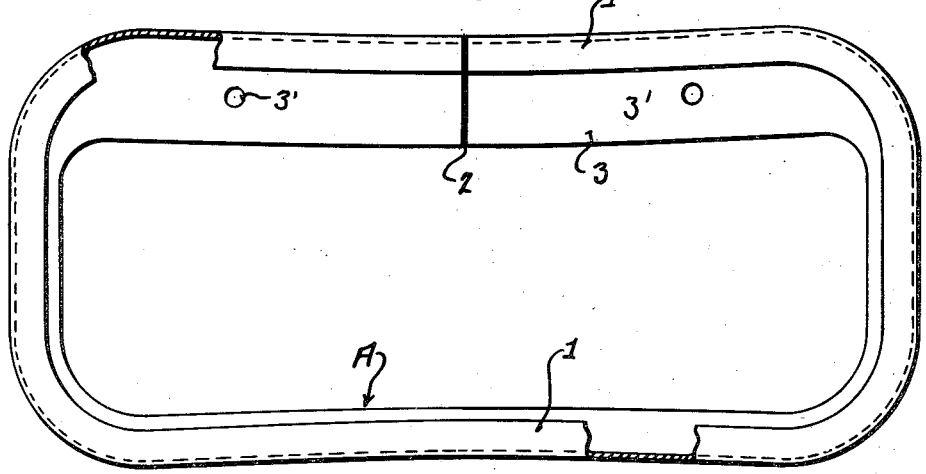
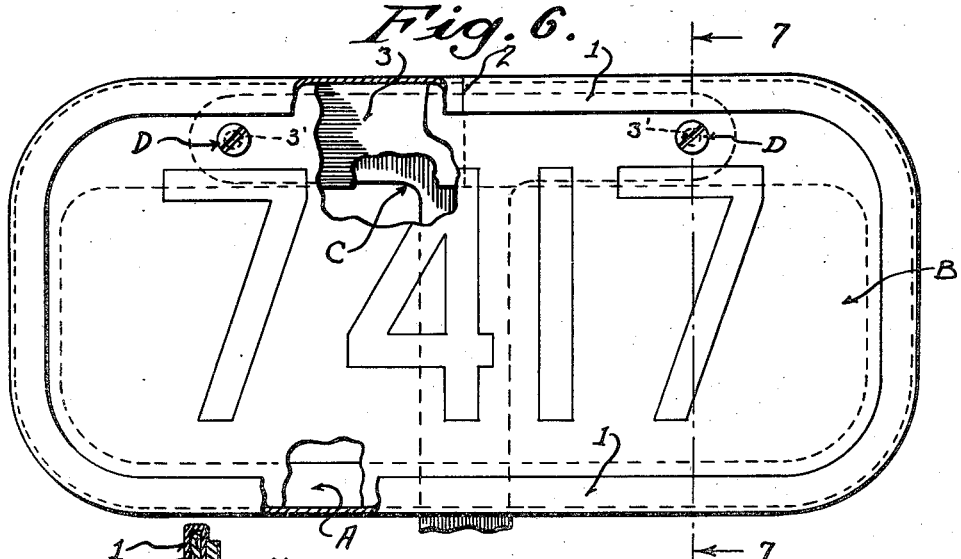
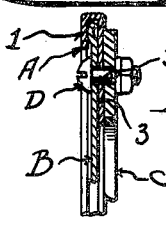
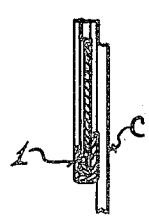
INVENTORS
LOUIS T. HEIN
HARRY BRATIS
BY 
ATTORNEYS Patented July 8, 1952

2,602,190

UNITED STATES PATENT OFFICE 2,602,190

MOLD FOR PRODUCING A PLASTIC EDGE PROTECTOR FOR LICENSE PLATES

Louis T. Hein and Harry Bratis, Racine, Wis.

Application August 2, 1948, Serial No. 42,006

1 Claim. (Cl. 18—42)

Our invention appertains to a plastic channeled bead-strip, to be trained over the knife edge of a license plate for protecting the same and more particularly to a mold for forming the same.

The primary object of our invention is to provide a simple apparatus for molding the said bead-strip for license plates by utilizing upper and lower mold blocks having a spring controlled core-plate therebetween, whereby the channeled bead-strip is molded, having an apron extended from one face of the bead, provided with retaining apertures therein, the same being developed by pins extending from the lower mold block.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Fig. 1 represents a cross sectional view of a two-part mold illustrating a channeled bead-strip formed therein, embodying the features of our invention, the section being indicated by line 1—1 of Fig. 3.

Fig. 2 is a similar sectional view illustrating the mold, the upper mold block lifted, in conjunction with a core-plate carrying the channeled bead-strip.

Fig. 3 is a plan view of the core-plate, upon a plane illustrated by line 3—3 of Fig. 2, with parts being broken away and in section to more clearly illustrate structural features.

Fig. 4 is a detail cross sectional view illustrating a rib for separating the ends of the bead-strip extending from the core-plate, the section being indicated by line 4—4 of Fig. 3.

Fig. 5 is a plan view of the molded channeled bead-strip.

Fig. 6 is a face view of a license plate having mounted thereon a bead-strip, embodying the features of our invention, with parts broken away and parts in section to more clearly illustrate structural features; and Fig. 7 is a cross sectional view through the same, the section being indicated by line 7—7 of Fig. 6.

Referring by characters to the drawings, especially Fig. 5 thereof, A indicates a bead-strip in rectangular formation, having a channel 1 extending thereabout in loop formation, with its ends 2 in flush engagement, the same being interrupted upon one of the long faces of said strip.

The interrupted side of the strip has an apron 3 extending inwardly from one face of the channel, and said apron is provided with anchor receiving apertures 3'—3'.

As particularly noted in Fig. 5 of the drawings, the strip is molded with slightly bowed upper and lower long sides, whereby, when said channeled strip is trained about the edges of a license plate B, the long bowed sides will spring outwardly and assume parallel straight lines engaging the corresponding straight edges of the license plate.

Thereafter, the channeled strip is anchored to a standard bracket C, by means of bolts D, which bolts pass through the apertures in the apron 3, it being understood that the apron is positioned upon the rear face of the license plate.

Thus it is apparent that all that is required to adjust the bead-strip is to remove the license plate from the bracket, fit the strip about its edges and then anchor the plate and associated bead-strip by the retaining bolts D to the bracket C.

It is understood, owing to the fact that the channeled bead-strip is fabricated from plastic, a certain amount of elasticity inherent in the material will readily permit the strip to be correctly attached to the plate, whereby, for example, in cleaning a car, the operator will not inadvertently injure his hands by coming in contact with the cutting edge of said license plate.

As best indicated in Figs. 1 to 4 inclusive, the mold comprises an upper block 4 and a lower block 4'. The upper and lower blocks are formed with semi-bear recesses 5—5', and the upper bead recess is formed with an apron extension 6. Extending upwardly from the lower block 4' are pins 7, which pins, when the mold is closed, enter sockets 7' in the upper mold block, whereby anchor apertures may be formed in the strip apron.

The lower block is provided with shouldered and bored openings 8—8, into which are mounted plunger studs 9, which studs carry a flat core-plate 10. Interposed between the core-plate and shoulders of the bored openings 8, are coil springs 9', as best indicated in Figs. 1 and 2 of the drawings.

The upper and the lower surfaces of the core plate 10 are provided with transversely extending mold ribs 11, forming the separation channel for the bead strip 2. The upper rib is received within the apron 6, and the lower rib is received in the recess 5, when the mold is closed. The core plate 10, is also provided with apertures in alignment with the pins 7, whereby when the mold members are closed the pins 7, will pass through the core plate 10, and enter the sockets 7' in the upper mold block 4.

Hence, it is apparent that these bead-strips may be quickly and cheaply molded and that their upper and lower long edges, due to the formation of the mold, will be bowed slightly. After the plastic has been poured and the bead-strip completed, the upper mold block is lifted, whereby the core-plate, under spring tension, will rise from its seat, as best shown in Fig. 2 of the drawings, and strip the completed bead-strip from the lower mold block, whereby it can readily be removed, it being understood that the meeting ends of the strip are separated by a core carried mold rib 11, which rib transversely intersects the bead-strip upon both faces of the core-plate, whereby the bead is completely severed in a molding operation.

While we have illustrated the core-plate 10 being provided with spring controlled studs 9, we preferably will dispense with the stud springs and utilize mechanical means, in conjunction with the studs, for stripping the core-plate from the mold.

We claim:

A mold for a channeled bead strip, comprising upper and lower mold blocks having semi-bead recesses in the meeting faces thereof, the upper block recess being of a greater cross-sectional area than the lower block bead recess to form an apron, said upper block having socket openings in the recess, aperture mold pins extending from the lower block movable in the sockets when the blocks are moved into engagement with one another, a flat vertically movable core-plate disposed between the upper and lower blocks, adapted to be nested in the semi-recesses of said blocks when the mold is closed, a series of headed plunger studs each having one end rigidly secured to the core plate and its other end slidably held to the lower block, and means including a series of springs each surrounding a plunger stud and normally urging the flat core plate to a raised position when the blocks are in their open separated position, whereby when the blocks are separated the core plate will be automatically raised but firmly held to the lower block.

LOUIS T. HEIN.
HARRY BRATIS.

REFERENCES CITED

The following references are of record in the file of this patent:

UNITED STATES PATENTS

| Number | Name | Date |
|--------|------|------|
| 558,162 | Doughty | Apr. 14, 1896 |
| 809,143 | Schutz | Jan. 2, 1906 |
| 1,353,477 | Jamieson | Sept. 21, 1920 |
| 1,525,988 | Hachtel | Feb. 10, 1925 |
| 1,534,780 | Hansen | Apr. 21, 1925 |
| 1,793,089 | Heyes | Feb. 17, 1931 |
| 1,801,613 | Ratzer | Apr. 21, 1931 |
| 1,899,907 | Young | Feb. 28, 1933 |
| 2,003,092 | Richards | May 28, 1935 |
| 2,160,960 | Dinstbir | June 6, 1939 |
| 2,194,106 | Wiley | Mar. 19, 1940 |
| 2,197,676 | Barth | Apr. 16, 1940 |
| 2,296,744 | Simmons | Sept. 22, 1942 |
| 2,360,011 | Popp | Oct. 10, 1944 |
| 2,421,058 | Eckstein | May 27, 1947 |